United States Patent
Chen et al.

(10) Patent No.: US 9,611,151 B2
(45) Date of Patent: Apr. 4, 2017

(54) ELECTROLYTE SUPPLEMENT SYSTEM IN ALUMINIUM ELECTROLYSIS PROCESS AND METHOD FOR PREPARING THE SAME

(71) Applicant: SHENZHEN SUNXING LIGHT ALLOYS MATERIALS CO., LTD, Baoan District, Shenzhen, Guangdong (CN)

(72) Inventors: Xuemin Chen, Guangdong (CN); Jun Yang, Guangdong (CN); Zhihong Li, Guangdong (CN); Weiping Wu, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/160,660

(22) Filed: Jan. 22, 2014

(65) Prior Publication Data

US 2014/0131215 A1    May 15, 2014

Related U.S. Application Data

(62) Division of application No. 13/709,022, filed on Dec. 9, 2012, now Pat. No. 8,679,318.

(30) Foreign Application Priority Data

May 23, 2012  (CN) .......................... 2012 1 0161986
May 30, 2012  (CN) .......................... 2012 1 0172848

(51) Int. Cl.
| | |
|---|---|
| *C25C 3/18* | (2006.01) |
| *C01D 3/02* | (2006.01) |
| *C01F 7/54* | (2006.01) |
| *C01F 1/00* | (2006.01) |

(52) U.S. Cl.
CPC ............. *C01D 3/02* (2013.01); *C01F 1/00* (2013.01); *C01F 7/54* (2013.01); *C25C 3/18* (2013.01)

(58) Field of Classification Search
None
See application file for complete search history.

(56) References Cited

U.S. PATENT DOCUMENTS

| | | | | |
|---|---|---|---|---|
| 5,006,209 | A | * 4/1991 | Beck | ........... C25C 3/06 204/233 |
| 5,284,562 | A | * 2/1994 | Beck | ........... C25C 3/12 204/244 |
| 2005/0092619 | A1 | * 5/2005 | Hryn et al. | .......... 205/394 |
| 2008/0245447 | A1 | * 10/2008 | Birol et al. | ............ 148/437 |

FOREIGN PATENT DOCUMENTS

WO    WO 2012/042075 A1  *  4/2012 ............... C25C 3/18

OTHER PUBLICATIONS

Apisarov et al, "Physical-Chemical Properties of the KF—NaF—AlF3 Molten System with Low Cryolite Ratio", Light Metals 2009 (no month), pp. 401-403.*
Dedyukhin et al, "Electrical conductivity of the KF—NaF—AlF3 molten system at low cryolite ratio", The Electrochemical Society, 214th ECS Meeting, 2009.*
Danielik et al, Phase Diagram of the System NaF—KF—AlF3, Journal of Thermal Analysis and Calorimetry, vol. 76, Issue 3, Jun. 2004, pp. 763-773.*
Chen et al, Phase Diagram of the System KF—AlF3, Journal of the American Ceramic Society, vol. 83, Issue 12, Dec. 2000, pp. 3196-3198.*

* cited by examiner

*Primary Examiner* — Harry D Wilkins, III
(74) *Attorney, Agent, or Firm* — Jackson IPG PLLC; Demian K. Jackson

(57) ABSTRACT

The disclosure provides an electrolyte supplement system in an aluminum electrolysis process, which includes low-molecular-ratio cryolite, wherein the low-molecular-ratio cryolite is selected from $mKF.AlF_3$, $nNaF.AlF_3$ or mixture thereof, where m=1~1.5 and n=1~1.5. When the electrolyte supplement system provided by the disclosure is applied to the aluminum electrolytic industry, electrolytic temperature can be reduced obviously in the aluminum electrolysis process without changing the existing electrolytic process; thus, power consumption is reduced, volatilization loss of fluoride is reduced and the comprehensive cost of production is reduced.

1 Claim, No Drawings

ELECTROLYTE SUPPLEMENT SYSTEM IN ALUMINIUM ELECTROLYSIS PROCESS AND METHOD FOR PREPARING THE SAME

TECHNICAL FIELD OF THE INVENTION

The disclosure relates to an electrolyte, and in particular to an electrolyte supplement system in an aluminium electrolysis process and a method for preparing the same.

BACKGROUND OF THE INVENTION

At present, aluminium electrolytic industry still employs a conventional Hall-Heroult process; electrolyte always takes cryolite-aluminium oxide as a basic system, and the cryolite generally adopts sodium fluoroaluminate. As the aluminium electrolysis process progresses, the sodium fluoroaluminate and aluminium oxide are continuously consumed; therefore, in order to ensure the continuous progressing of aluminium electrolysis, it is necessary to supplement electrolyte and aluminium oxide to the electrolyte basic system respectively. The existing electrolyte supplement system mainly includes aluminium fluoride and sodium fluoroaluminate; the electrolytic temperature needs to be maintained at about 960 DEG C. in the entire aluminium electrolysis process and thus power consumption is high, this is mainly because the liquidus temperature of the electrolyte is high and it is necessary to keep a certain temperature of superheat degree to make the aluminium oxide have a better solubility.

The method for preparing cryolite in industry generally adopts a synthesis method, in which anhydrous hydrofluoric acid reacts with aluminium hydroxide to form fluoaluminic acid; then the fluoaluminic acid reacts with sodium hydroxide or potassium hydroxide at a high temperature; after processes of filtering, drying, melting and crushing, the cryolite is prepared, wherein the cryolite synthesized by this method has a molecular ratio of m=3.0, with a relatively high melting point. The cryolite synthesized by the existing industrial synthesis method has a molecular ratio of m=2.0~3.0, and it is difficult to obtain the relatively pure low-molecular-ratio cryolite with a molecular ratio of m=1.0~1.5.

Therefore, the conventional art has disadvantages that the electrolytic power consumption is high and the electrolyte supplement system is not ideal.

SUMMARY OF THE INVENTION

In order to solve the technical problem existing in the conventional art, the inventor has done a great deal of research in the selection and preparation of electrolyte supplement system and unexpectedly finds that replacing the existing electrolyte supplement system by the electrolyte supplement system of low-molecular-ratio cryolite to perform aluminium electrolysis can cause an obvious reduction of electrolytic temperature in the aluminium electrolysis process without changing the existing electrolytic process, thus, power consumption is reduced, volatilization loss of fluoride is reduced and comprehensive cost of production is reduced.

The disclosure provides an electrolyte supplement system in an aluminium electrolysis process, which includes low-molecular-ratio cryolite, wherein the low-molecular-ratio cryolite is selected from $mKF \cdot AlF_3$, $nNaF \cdot AlF_3$ or mixture thereof, where m=1~1.5 and n=1~1.5.

With the technical scheme above, when the electrolyte supplement system provided by the disclosure is applied to the aluminium electrolytic industry, the solubility property of aluminium oxide is improved, thus, the electrolytic temperature is reduced, the power consumption is reduced, the volatilization loss of fluoride is reduced, the electrolytic efficiency is improved and the comprehensive cost of production is reduced.

As a further improvement of the disclosure, the low-molecular-ratio cryolite is selected from $mKF \cdot AlF_3$, where m=1, 1.2 or 1.5. Aluminum oxide has a solubility of about 7 g/l in a $3NaF \cdot AlF_3$ melt liquid, and compared with the $3NaF \cdot AlF_3$ the aluminum oxide has a solubility of 15~20 g/l in a melt liquid including $3/2KF \cdot AlF_3$, $KF \cdot AlF_3$, $6/5KF \cdot AlF_3$, thus, the solubility of the latter is greatly improved; the addition of the electrolyte supplement system consisting of low-molecular-ratio potassium cryolite ($3/2KF \cdot AlF_3$, $KF \cdot AlF_3$, $6/5KF \cdot AlF_3$) can cause an obvious reduction of electrolytic temperature and finally to a temperature of between 800 and 850 DEG C.

As a further improvement of the disclosure, the low-molecular-ratio cryolite is selected from the mixture of $mKF \cdot AlF_3$ and $nNaF \cdot AlF_3$, and the mole ratio of the $mKF \cdot AlF_3$ to the $nNaF \cdot AlF$ is 1:1~1:3, where m=1, 1.2 or 1.5 and n=1, 1.2 or 1.5. Aluminum oxide has a solubility of about 7 g/l in a $3NaF \cdot AlF_3$ melt liquid, a solubility of 12 g/l in a system consisting of $3/2KF \cdot AlF_3$ and $3/2NaF \cdot AlF_3$ with a mole ratio of 1:1, and a solubility of 15 g/l in a system consisting of $KF \cdot AlF_3$ and $NaF \cdot AlF_3$ with a mole ratio of 1:1; the addition of the electrolyte supplement system consisting of low-molecular-ratio potassium cryolite mixture (consisting of $mKF \cdot AlF_3$ and $nKF \cdot AlF$ with a mole ratio of 1:1~1:3) can cause a reduction of electrolytic temperature and finally to a temperature of between 850 and 900 DEG C.

As a further improvement of the disclosure, the low-molecular-ratio cryolite is selected from $nNaF \cdot AlF_3$, where n=1, 1.2 or 1.5. Aluminum oxide has a solubility of about 7 g/l in a $3NaF \cdot AlF_3$ melt liquid, and compared with the $3NaF \cdot AlF_3$ the aluminum oxide has a solubility of 7~10 g/l in a melt liquid including $3/2NaF \cdot AlF_3$, $NaF \cdot AlF_3$, $6/5NaF \cdot AlF_3$, thus, the solubility of the latter is slightly improved; the addition of the electrolyte supplement system consisting of low-molecular-ratio sodium cryolite ($3/2NaF \cdot AlF_3$, $NaF \cdot AlF_3$, $6/5NaF \cdot AlF_3$) can cause a reduction of electrolytic temperature and finally to a temperature of between 900 and 960 DEG C.

As a further improvement of the disclosure, the electrolyte supplement system in the aluminium electrolysis process provided by the disclosure further includes $3KF \cdot AlF_3$, $3NaF \cdot AlF_3$ or mixture thereof. The low-molecular-ratio cryolite provided by the disclosure is mixed with $3KF \cdot AlF_3$, $3NaF \cdot AlF_3$ or mixture thereof and then the mixture is added in an electrolytic cell as the electrolyte supplement system in the aluminium electrolysis process, when the weight percentage of the low-molecular-ratio cryolite is over 20% of the entire electrolyte supplement system, the electrolytic temperature can be reduced; moreover, the electrolytic temperature decreases as the weight percentage of the low-molecular-ratio cryolite increases.

Correspondingly, the disclosure also provides a method for preparing the electrolyte supplement system in the aluminium electrolysis process, which includes the following steps:

A) putting aluminium into a reactor, injecting an inert gas to the reactor after vacuumizing, heating the reactor to a temperature of between 700 and 850 DEG C., adding one or more of potassium fluotitanate, potassium fluoborate, sodium fluotitanate and sodium fluoborate in the reactor;

B) stirring for 4 to 6 hours, then pumping the superstratum melt liquid to obtain the electrolyte supplement system in the aluminium electrolysis process, wherein the reaction formula involved includes: $3/4K_2TiF_6+Al=3/4Ti+3/2KF.AlF_3$; $3/4Na_2TiF_6+Al=3/4Ti+3/2NaF.AlF_3$; $KBF_4+Al=B+KF.AlF_3$; $NaBF_4+Al=B+NaF.AlF_3$; $K_2TiF_6+2KBF_410/3Al=TiB_2+10/3[6/5KF.AlF_3]$; $Na_2TiF_6+2NaBF_4+10/3Al=TiB_2+10/3[6/5NaF.AlF_3]$;
when aluminium is excessive,

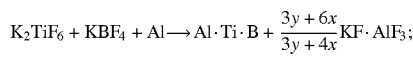

when aluminium is excessive,

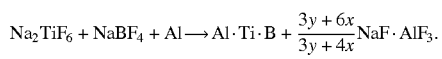

The preparation method provided by the disclosure has advantages of mild reaction conditions, easy control, simple process, full reaction and high quality of reaction product.

As a further improvement of the disclosure, the method for preparing the electrolyte supplement system in the aluminium electrolysis process includes the following steps:

A) putting aluminium into a reactor, injecting an inert gas to the reactor after vacuumizing, heating the reactor to a temperature of between 700 and 850 DEG C., adding potassium fluoborate in the reactor;

B) stirring for 4 to 6 hours, then pumping the superstratum melt liquid to obtain the electrolyte supplement system $KF.AlF_3$ in the aluminium electrolysis process, wherein the reaction formula involved is: $KBF_4+Al=B+KF.AlF_3$.

As a further improvement of the disclosure, the method for preparing the electrolyte supplement system in the aluminium electrolysis process includes the following steps:

A) putting aluminium into a reactor, injecting an inert gas to the reactor after vacuumizing, heating the reactor to a temperature of between 700 and 850 DEG C., adding the mixture of sodium fluoborate and sodium fluotitanate with a mole ratio of 2:1 in the reactor;

B) stirring for 4 to 6 hours, then pumping the superstratum melt liquid to obtain the electrolyte supplement system $6/5NaF.AlF_3$ in the aluminium electrolysis process, wherein the reaction formula involved is:

$Na_2TiF_6+2NaBF_4+10/3Al=TiB_2+10/3[6/5NaF.AlF_3]$.

As a further improvement of the disclosure, the method for preparing the electrolyte supplement system in the aluminium electrolysis process includes the following steps:

A) putting aluminium into a reactor, injecting an inert gas to the reactor after vacuumizing, heating the reactor to a temperature of between 700 and 850 DEG C., adding potassium fluoborate; stirring for 4 to 6 hours, then pumping the superstratum melt liquid to obtain potassium cryolite of which the molecular formula is $KF.AlF_3$; adding the mixture of sodium fluoborate and sodium fluotitanate with a mole ratio of 2:1 in the reactor; stirring for 4 to 6 hours, then pumping the superstratum melt liquid to obtain sodium cryolite of which the molecular formula is $6/5NaF.AlF_3$;

B) mixing the obtained potassium cryolite $KF.AlF_3$ with the obtained sodium cryolite $6/5NaF.AlF_3$ in a mole ratio cryolite of 1:1~1:3 to obtain the electrolyte supplement system cryolite mixture in the aluminium electrolysis process, wherein the reaction formula involved is: $KBF_4+Al=B+KF.AlF_3$;

$Na_2TiF_6+2NaBF_4+10/3Al=TiB_2+10/3[6/5NaF.AlF_3]$.

As a further improvement of the disclosure, the method for preparing the electrolyte supplement system in the aluminium electrolysis process includes the following steps:

A) putting excessive aluminium into a reactor, heating the reactor to a temperature of between 700 and 850 DEG C., adding the mixture of potassium fluoborate and potassium fluotitanate with a mole ratio of y:x in the reactor and stirring for 0.5 to 6 hours, pumping the superstratum melt liquid to obtain potassium cryolite of which the molecular formula is

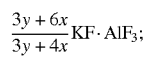

putting excessive aluminium into another reactor, heating the reactor to a temperature of between 700 and 850 DEG C., adding the mixture of sodium fluoborate and sodium fluotitanate with a mole ratio of y:x in the reactor and stirring for 0.5 to 6 hours, pumping the superstratum melt liquid to obtain sodium cryolite of which the molecular formula is

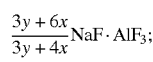

B) mixing the obtained potassium cryolite with the obtained sodium cryolite in a mole ratio of 1:1~1:3, wherein the reaction formula involved is:

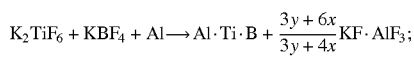

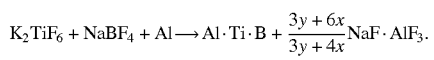

Compared with the conventional art, the disclosure has advantages as follows: when the electrolyte supplement system provided by the disclosure is applied to the aluminium electrolytic industry, the electrolytic temperature in the aluminium electrolysis process can be obviously reduced without changing the existing electrolytic process, thus, power consumption is reduced, volatilization loss of fluoride is reduced and comprehensive cost of production is reduced; the method for preparing cryolite provided by the disclosure has advantages of mild reaction conditions, easy control, simple process, full reaction and high quality of reaction product.

DETAILED DESCRIPTION OF THE EMBODIMENTS

The disclosure is described below in further detail through specific embodiments.

Embodiment 1

Weighing 1 ton of aluminium and putting it into a reactor, injecting argon to the reactor for protection after vacuumizing, heating the reactor to a temperature of 780 DEG C., adding dried potassium fluoborate in the reactor slowly in accordance with a reaction ratio and stirring quickly for 5 hours to form boron and potassium cryolite $KF.AlF_3$, opening the cover of the reactor, pumping the superstratum melt liquid potassium cryolite $KF.AlF_3$ through a siphon-pump.

Adding the electrolyte supplement system $KF.AlF_3$ in the aluminium electrolysis process to the electrolyte basic system consumed continuously, which can cause an obvious reduction of electrolytic temperature and finally to a temperature of between 800 and 820 DEG C. Since the corrosivity of the potassium cryolite $KF.AlF_3$ is stronger than that of the sodium fluoroaluminate, in order to prolong the service life of the electrolytic cell, the electrolytic cell needs to adopt an inert anode or a cathode subjected to inert surface treatment.

Embodiment 2

Weighing 1 ton of aluminium and putting it into a reactor, injecting argon to the reactor for protection after vacuumizing, heating the reactor to a temperature of 800 DEG C., adding dried potassium fluotitanate in the reactor slowly in accordance with a reaction ratio and stirring quickly for 5 hours to form titanium sponge and potassium cryolite $3/2KF.AlF_3$, opening the cover of the reactor, pumping the superstratum melt liquid potassium cryolite $3/2KF.AlF_3$ through a siphon-pump.

Adding the electrolyte supplement system $3/2KF.AlF_3$ in the aluminium electrolysis process to the electrolyte basic system consumed continuously, which can cause an obvious reduction of electrolytic temperature and finally to a temperature of between 820 and 850 DEG C. Since the corrosivity of the potassium cryolite $KF.AlF_3$ is stronger than that of the sodium fluoroaluminate, in order to prolong the service life of the electrolytic cell, the electrolytic cell needs to adopt an inert anode or a cathode subjected to inert surface treatment.

Embodiment 3

Weighing 1 ton of aluminium and putting it into a reactor, injecting argon to the reactor for protection after vacuumizing, heating the reactor to a temperature of 750 DEG C., adding the mixture of dried sodium fluoborate and sodium fluotitanate in the reactor slowly in accordance with a reaction ratio, wherein the mole ratio of the sodium fluoborate to the sodium fluotitanate is 2:1; stirring quickly for 5 hours to form titanium boride and sodium cryolite $6/5NaF.AlF_3$, opening the cover of the reactor, pumping the superstratum melt liquid sodium cryolite $6/5NaF.AlF_3$ through a siphon-pump.

Adding the electrolyte supplement system $6/5NaF.AlF_3$ in the aluminium electrolysis process to the electrolyte basic system consumed continuously, which can cause a reduction of electrolytic temperature and finally to a temperature of between 900 and 930 DEG C.

Embodiment 4

Weighing 1 ton of aluminium and putting it into a reactor, injecting argon to the reactor for protection after vacuumizing, heating the reactor to a temperature of 780 DEG C., adding dried potassium fluoborate in the reactor slowly in accordance with a reaction ratio and stirring quickly for 5 hours to form boron and potassium cryolite $KF.AlF_3$, opening the cover of the reactor, pumping the superstratum melt liquid potassium cryolite $KF.AlF_3$ through a siphon-pump. Weighing 1 ton of aluminium and putting it into a reactor, injecting argon to the reactor for protection after vacuumizing, heating the reactor to a temperature of 750 DEG C., adding the mixture of dried sodium fluoborate and sodium fluotitanate in the reactor slowly in accordance with a reaction ratio, wherein the mole ratio of the sodium fluoborate to the sodium fluotitanate is 2:1; stirring quickly for 5 hours to form titanium boride and sodium cryolite $6/5NaF.AlF_3$, opening the cover of the reactor, pumping the superstratum melt liquid sodium cryolite $6/5NaF.AlF_3$ through a siphon-pump Mixing the obtained potassium cryolite $KF.AlF_3$ with the obtained sodium cryolite $6/5NaF.AlF_3$ in a mole ratio of 1:1 and adding the mixture to the electrolyte basic system consumed continuously as the electrolyte supplement system in the aluminium electrolysis process, which can cause an obvious reduction of electrolytic temperature and finally to a temperature of between 860 and 880 DEG C. Since the corrosivity of the potassium cryolite $KF.AlF_3$ is stronger than that of the sodium fluoroaluminate, in order to prolong the service life of the electrolytic cell, the anode and cathode of the electrolytic cell had better subject to inert surface treatment.

Embodiment 5

Weighing 5 tons of aluminium and putting it into a reactor, heating the reactor to a temperature of 750 DEG C., adding 2 tons of mixture of dried potassium fluoborate and potassium fluotitanate in the reactor slowly, wherein the mole ratio of the potassium fluoborate to the potassium fluotitanate is 1:1; stirring quickly for 4 hours to form aluminium-titanium-boron alloy and potassium cryolite $9/7KF.AlF_3$ due to excessive aluminium, opening the cover of the reactor, pumping the superstratum melt liquid potassium cryolite $9/7KF.AlF_3$ through a siphon-pump. Weighing 1 ton of aluminium and putting it into a reactor, injecting argon to the reactor for protection after vacuumizing, heating the reactor to a temperature of 780 DEG C., adding dried sodium fluoborate in the reactor slowly in accordance with a reaction ratio and stirring quickly for 5 hours to form boron and sodium cryolite $NaF.AlF_3$, opening the cover of the reactor, pumping the superstratum melt liquid sodium cryolite $NaF.AlF_3$ through a siphon-pump.

Mixing the obtained potassium cryolite $9/7KF.AlF_3$ with the obtained sodium cryolite $NaF.AlF_3$ in a mole ratio of 1:1 and adding the mixture to the electrolyte basic system consumed continuously as the electrolyte supplement system in the aluminium electrolysis process, which can cause an obvious reduction of electrolytic temperature and finally to a temperature of between 850 and 880 DEG C. Since the corrosivity of the potassium cryolite $9/7KF.AlF_3$ is stronger than that of the sodium fluoroaluminate, in order to prolong the service life of the electrolytic cell, the anode and cathode of the electrolytic cell had better subject to inert surface treatment.

Embodiment 6

Weighing 1 ton of aluminium and putting it into a reactor, injecting argon to the reactor for protection after vacuumizing, heating the reactor to a temperature of 750 DEG C., adding the mixture of dried potassium fluoborate and potassium fluotitanate in the reactor slowly in accordance with a reaction ratio, wherein the mole ratio of the potassium fluoborate to the potassium fluotitanate is 2:1; stirring quickly for 5 hours to form titanium boride and potassium cryolite 6/5KF.AlF$_3$, opening the cover of the reactor, pumping the superstratum melt liquid potassium cryolite 6/5KF.AlF$_3$ through a siphon-pump. Weighing 5 tons of aluminium and putting it into a reactor, heating the reactor to a temperature of 750 DEG C., adding 2 tons of mixture of dried sodium fluoborate and sodium fluotitanate in the reactor slowly, wherein the mole ratio of the sodium fluoborate to the sodium fluotitanate is 1:1; stirring quickly for 4 hours to form aluminium-titanium-boron alloy and sodium cryolite 9/7NaF.AlF$_3$ due to excessive aluminium, opening the cover of the reactor, pumping the superstratum melt liquid sodium cryolite 9/7NaF.AlF$_3$ through a siphon-pump.

Mixing the obtained potassium cryolite 6/5KF.AlF$_3$ with the obtained sodium cryolite 9/7NaF.AlF$_3$ in a mole ratio of 1:3 and adding the mixture to the electrolyte basic system consumed continuously as the electrolyte supplement system in the aluminium electrolysis process, which can cause an obvious reduction of electrolytic temperature and finally to a temperature of between 870 and 890 DEG C. Since the corrosivity of the potassium cryolite 6/5KF.AlF$_3$ is stronger than that of the sodium fluoroaluminate, in order to prolong the service life of the electrolytic cell, the anode and cathode of the electrolytic cell had better subject to inert surface treatment.

The above are the further detailed description of the disclosure made in conjunction with specific preferred embodiments; it can not be considered that the specific embodiment of the disclosure is only limited to the description above. For the common technicians in the technical field of the disclosure, umpty simple deductions or substitutes can be made without departing from the concept of the disclosure and they are deemed to be included within the scope of protection of the disclosure.

What is claimed is:

1. An electrolyte supplement system in an aluminum electrolysis process, which includes low-molecular-ratio cryolite, wherein the low-molecular-ratio cryolite is a mixture of mKF•AlF$_3$ and nNaF•AlF$_3$, and the mole ratio of the mKF•AlF$_3$ to the nNaF•AlF$_3$ is 1:1~1.3, where m=1 or 1.2 and n=1 or 1.2.

* * * * *